(12) United States Patent
Seo

(10) Patent No.: US 11,998,077 B2
(45) Date of Patent: Jun. 4, 2024

(54) LOWER ROLLER STRUCTURE OF A HOT AIR WELDER

(71) Applicant: Han-Na Seo, Seoul (KR)

(72) Inventor: Han-Na Seo, Seoul (KR)

(*) Notice: Subject to any disclaimer, the term of this patent is extended or adjusted under 35 U.S.C. 154(b) by 0 days.

(21) Appl. No.: 17/892,715

(22) Filed: Aug. 22, 2022

(65) Prior Publication Data
US 2023/0180874 A1 Jun. 15, 2023

(30) Foreign Application Priority Data
Dec. 9, 2021 (KR) .................. 10-2021-0175311

(51) Int. Cl.
*A41H 43/04* (2006.01)
*B29C 65/00* (2006.01)
*B29C 65/10* (2006.01)
*B29L 31/48* (2006.01)

(52) U.S. Cl.
CPC ............. *A41H 43/04* (2013.01); *B29C 65/10* (2013.01); *B29C 66/729* (2013.01); *B29C 66/82* (2013.01); *B29L 2031/48* (2013.01)

(58) Field of Classification Search
None
See application file for complete search history.

(56) References Cited

FOREIGN PATENT DOCUMENTS

| JP | 2003-326602 A | 11/2003 |
| KR | 10-0221140 B1 | 9/1999 |
| KR | 20-0221140 Y1 | 5/2001 |
| KR | 10-0876906 B1 | 1/2009 |
| KR | 10-1287241 B1 | 7/2013 |

OTHER PUBLICATIONS

Machine English translation of JP2003326602A, Accessed Sep. 26, 2023 (Year: 2003).*
Machine English translation of KR101287241, Accessed Sep. 26, 2023 (Year: 2013).*

* cited by examiner

*Primary Examiner* — Jacob T Minskey
*Assistant Examiner* — Adrianna N Konves
(74) *Attorney, Agent, or Firm* — NKL LAW; Jae Youn Kim

(57) ABSTRACT

Proposed is lower rollers of a hot air welder, and more particularly, to a lower roller structure of a hot air welder, which includes a first lower roller unit installed on a worktable to be pivoted vertically and a second lower roller unit installed on a main body to be slidably moved in front and rear, such that a welding operation of flat fabric and a welding operation of a cylindrical shape can be performed in a single hot air welder through alternate use of the first and second lower roller units.

5 Claims, 12 Drawing Sheets

LOWER ROLLER STRUCTURE OF A HOT AIR WELDER

CROSS-REFERENCE TO RELATED APPLICATION

This application claims priority to and the benefit of Korean Patent Application No. 10-2021-0175311 filed on Dec. 9, 2021, the disclosure of which is incorporated herein by reference in its entirety.

TECHNICAL FIELD

The present invention relates to lower rollers of a hot air welder, and more particularly, to a lower roller structure of a hot air welder, in which first and second lower roller units may be used alternately depending on the type of fabric to be worked, during hot air welding of flat fabrics or cylindrical fabrics such as sleeves of clothing.

BACKGROUND ART

In recent years, as leisure activities and hobbies are actively executed, various functional clothes or wears are widely used. In general, such various types of clothes should basically have a waterproof function. Wears having the waterproof function are produced by using waterproof fabrics.

Accordingly, clothes that require waterproofing, such as mountaineering clothes, ski clothes, raincoats, jumpers, hats, and the like, are manufactured by using the waterproof fabrics, thereby allowing a wearer to prepare for rain due to the waterproof action while faithfully performing the original function of the wears.

Meanwhile, in recent years, a hot air welder for synthetic resins as disclosed in Korean Utility Model Registration No. 0221140 and a hot air welder for a waterproof tape as disclosed in Korean Patent Registration No. 876906 are known in the art. These hot air welders may achieve complete waterproofing of the sewing section, which is vulnerable to waterproofing, by welding the waterproof tape to the sewing section of the waterproof fabric using high-temperature hot air.

These hot air welders heat the waterproof tape supplied together with the waterproof fabric by a discharge nozzle for discharging high-temperature hot air so that the waterproof tape in a molten state is welded to the sewing section of the waterproof fabric.

However, in the conventional hot air welder as described above, the lower roller is fixed to a worktable through a roller support part, etc. Therefore, entering and welding of flat fabrics is possible, but welding operation on cylindrical fabrics such as sleeves or necks of clothing is impossible. In order to weld such a cylindrical fabric, a hot air welder having a separate lower roller should be used, which results in an increase in costs and a deterioration in workability.

PRIOR ART DOCUMENT

Patent Document (Patent Document 0001) Korean Utility Model Registration Publication No. 20-0221140.
(Patent Document 0002) Korean Patent Registration Publication No. 10-876906.
(Patent Document 0003) Korean Patent Registration Publication No. 10-1287241.

SUMMARY OF THE INVENTION

Problems to be Solved

In consideration of the above-mentioned circumstances, it is an object of the present invention to provide a lower roller structure of a hot air welder, which includes a first lower roller unit installed on a worktable to be pivoted vertically and a second lower roller unit installed on a main body to be slidably moved in front and rear, such that a welding operation of flat fabric and a welding operation of a cylindrical shape can be performed in a single hot air welder through alternate use of the first and second lower roller units.

Means for Solving the Problems

As a specific means for achieving the above objects, there is provided a lower roller structure of a hot air welder which includes a main body having a worktable installed on one side of a middle portion thereof, a support arm unit which has a hot air generating means and a vertically movable upper roller at an upper portion of the main body, and extends to an upper side of the worktable, the lower roller structure including:
 a first lower roller unit including a first lower roller which is provided at one side of the main body on an upper side of the worktable, and is pivoted vertically corresponding to the upper roller; and
 a second lower roller unit including a second lower roller which is provided at a side surface of the main body on an upper side of the first lower roller unit and is slidably moved in front and rear corresponding to the upper roller;
 wherein the first lower roller unit and the second lower roller unit are replaced with each other so that one of the first lower roller and the second lower roller performs a welding operation on a flat fabric or a cylindrical fabric in association with the upper roller,
 wherein the second lower roller unit includes:
 a guide rail provided obliquely upward from the front to the rear on one side of the main body;
 a moving plate slidably coupled to the guide rail and having a guide roller;
 a guide tube whose rear end penetrates the moving plate, which extends toward the upper roller, and has a second lower roller installed at one end thereof;
 a second drive cylinder installed on the main body and connected to the moving plate by a piston rod to slide the moving plate in front and rear; and
 a moving plate stopper screwed to a support block on the front side of the main body to limit a forward moving force of the moving plate,
 wherein the second lower roller is positioned under or spaced apart from the upper roller by the sliding of the moving plate.
 At this time, the first lower roller unit includes:
 a rotation tube whose one end is coupled to a mounting bracket disposed on the worktable on one side of the main body and the other end is coupled with a roller support part which is pivoted vertically and extends toward the upper roller in a direction perpendicular to a longitudinal axis thereof, wherein the first lower roller is installed at a tip end of the roller support part;

a first drive cylinder installed on the worktable and having a piston rod for rotating the rotation tube; and a pivot bar whose one end is connected to the rotation tube and the other end is connected to the piston rod to convert a linear movement of the piston rod of the first drive cylinder into a rotational force of the rotation tube, wherein the first lower roller is positioned under or spaced apart from the upper roller by the rotation of the rotation tube, wherein the second lower roller unit includes:

a guide rail provided obliquely upward from the front to the rear on one side of the main body;

a moving plate slidably coupled to the guide rail and having a guide roller;

a guide tube whose rear end penetrates the moving plate, which extends toward the upper roller, and has a second lower roller installed at one end thereof;

a second drive cylinder installed on the main body and connected to the moving plate by a piston rod to slide the moving plate in front and rear; and a moving plate stopper screwed to a support block on the front side of the main body to limit a forward moving force of the moving plate, wherein the second lower roller is positioned under or spaced apart from the upper roller by the sliding of the moving plate.

Effects of the Invention

According to the present invention having the above-described configurations, there are advantages as follows. That is, the lower roller structure of a hot air welder according to the present invention includes the first lower roller unit configured to pivot vertically on the worktable, and a second lower roller unit configured to slide in front and rear on the main body. Therefore, welding operation on various fabrics is possible through alternate use of the first and second lower roller units in a single hot air welder, thereby costs may be reduced and workability may be further improved.

SPECIFIC EMBODIMENTS FOR CARRYING OUT THE INVENTION

The terms or words used in the specification and claims should not be construed as limited to a conventional or lexical meaning. Instead, based on a principle that an inventor may desirably define the concept of terms or words to describe his/her invention by means of the most preferable method, the terms or words should be construed as the meanings and concepts in compliance with technical ideas of the present invention.

Therefore, embodiments and drawings described in the present disclosure are simply the most preferred embodiment and do not represent all the technical sprites of the present invention, and it will be understood that various modifications and equivalents may be made to take the place of the embodiments at the time of filling the present application.

Hereinafter, preferred embodiments of the present invention will be described in detail with reference to the accompanying drawings.

Figure 1:
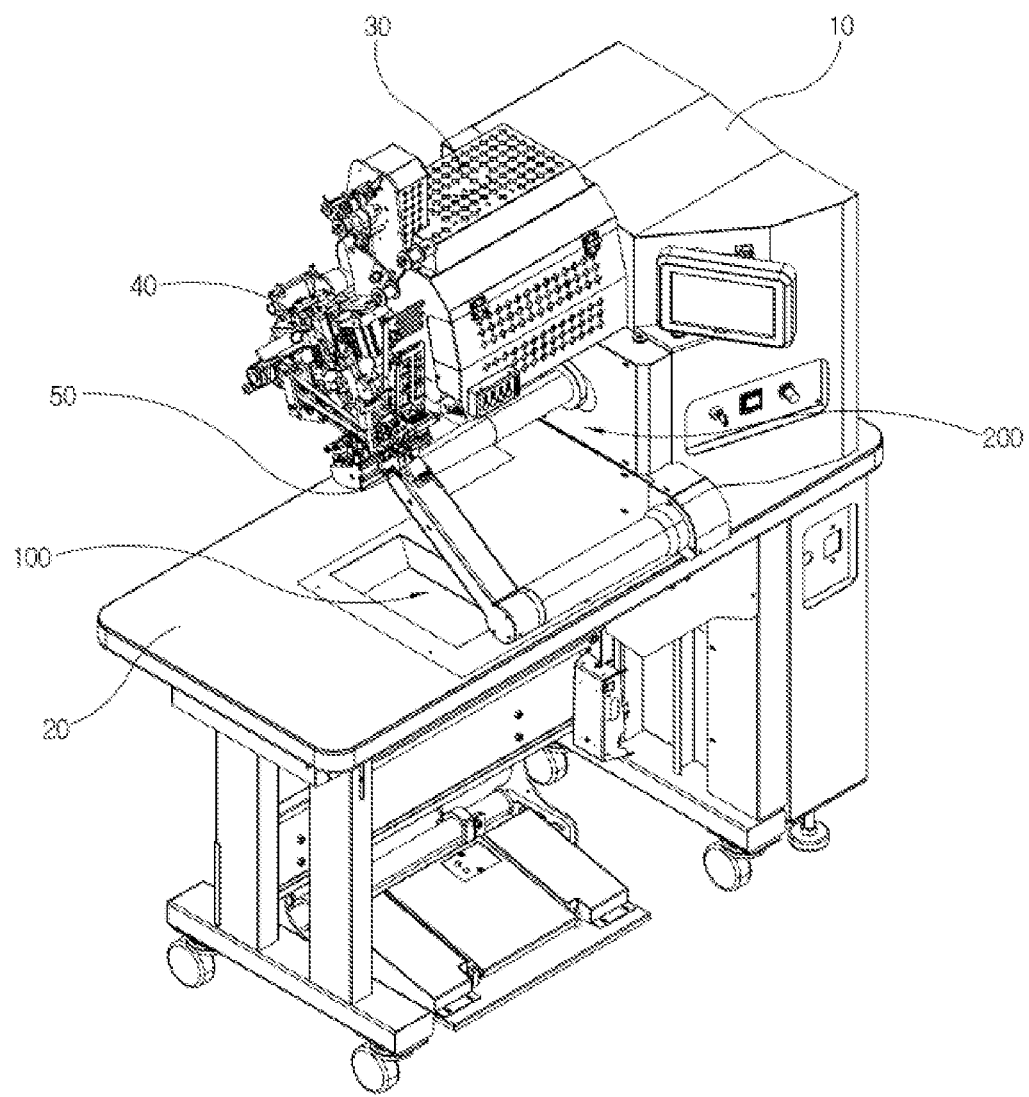
FIG. 1 is a view illustrating an entire hot air welder having a lower roller structure of a hot air welder according to the present invention.
Figure 2:
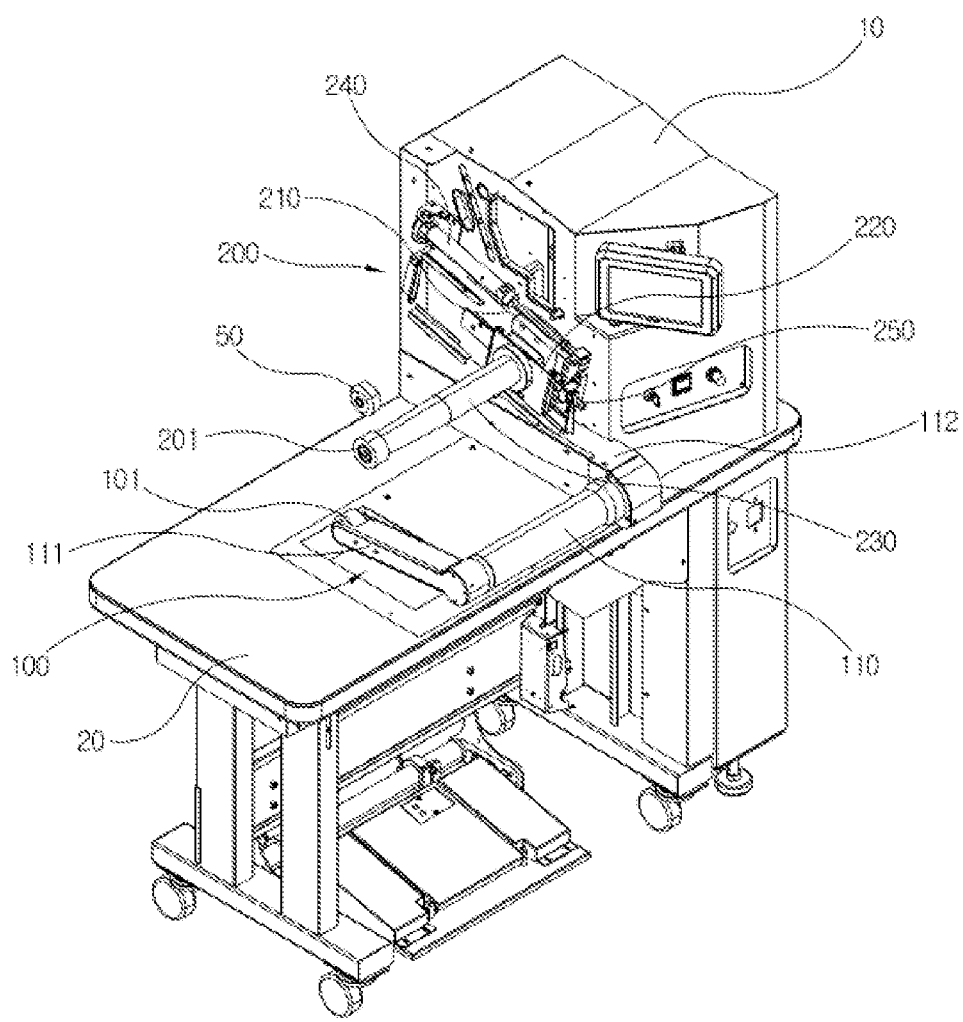
FIG. 2 is a perspective view illustrating the lower roller structure of a hot air welder according to the present invention.
Figure 3:
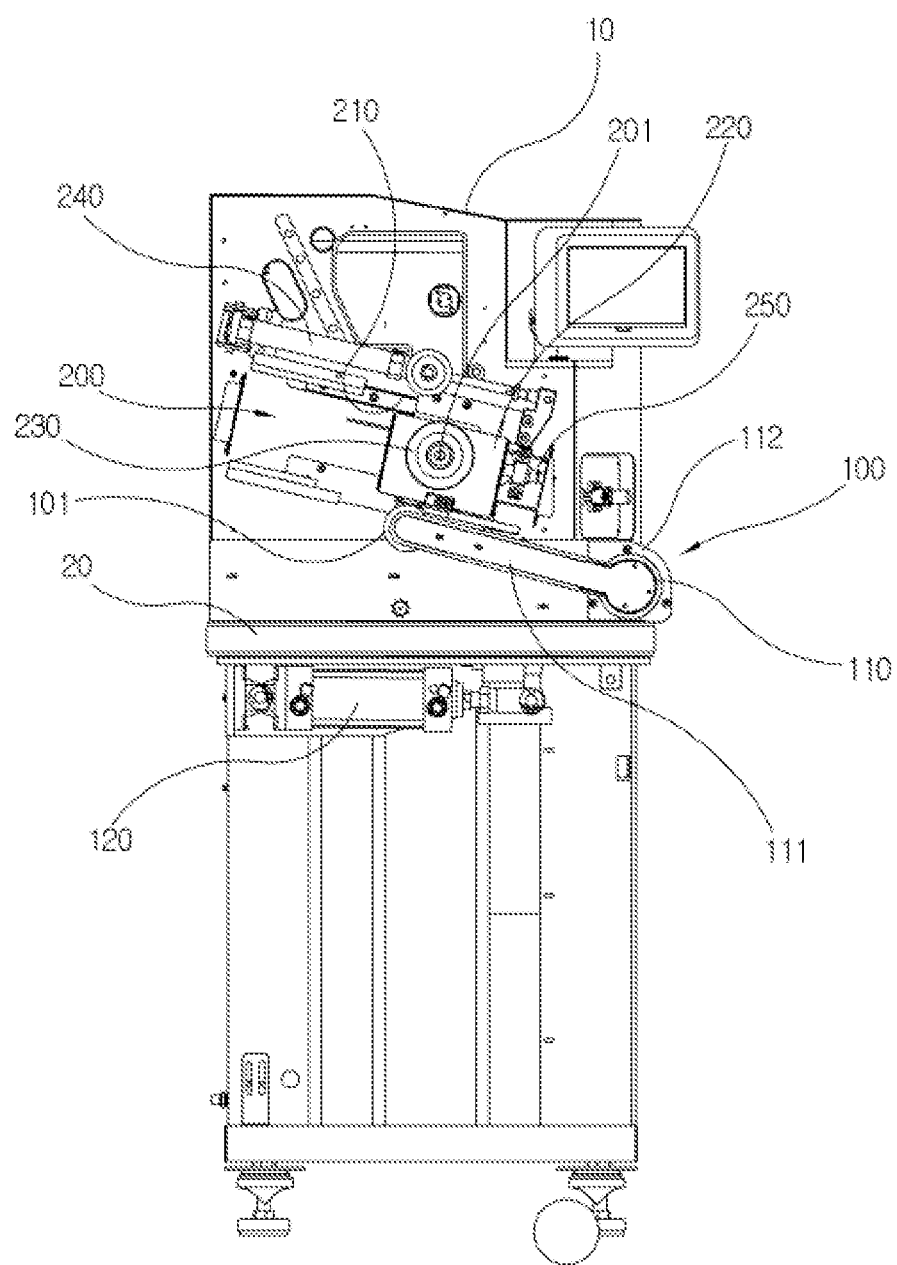
FIG. 3 is a side view illustrating the lower roller structure of a hot air welder according to the present invention.

As shown in FIGS. 1 to 3, a hot air welder includes a main body 10 having a worktable 20 installed on one side of a middle portion thereof, a support arm unit 30 which has a hot air generating means 40 and a vertically movable upper roller 50 at an upper portion of the main body 10, and extends to an upper side of the worktable 20. In such a hot air welder, a lower roller structure is configured to press a fabric with the upper roller 50 to perform hot welding, which includes a first lower roller unit 100 and a second lower roller unit 200.

Figure 4:
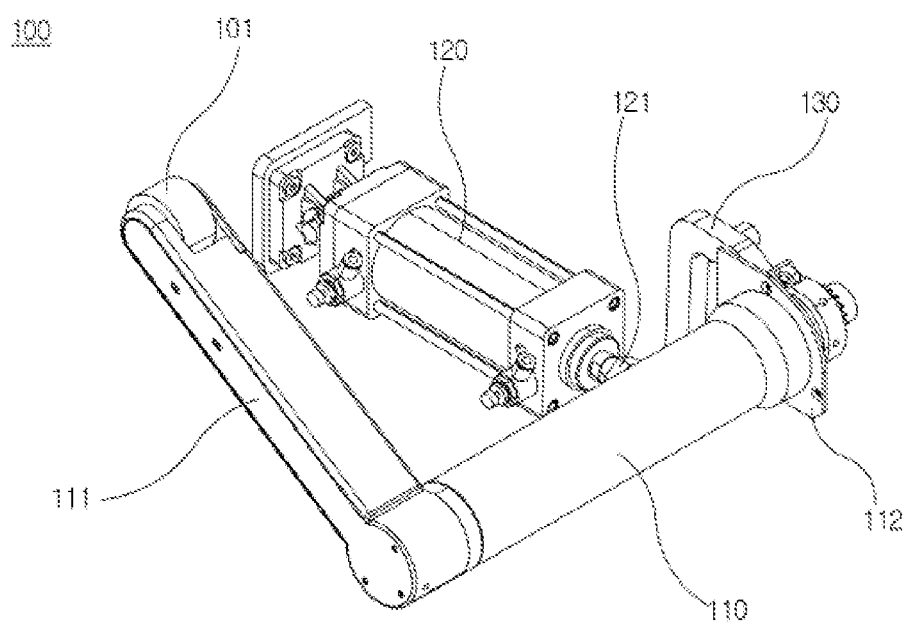
FIG. 4 is a perspective view illustrating a first lower roller unit of the lower roller structure of a hot air welder according to the present invention.
Figure 5:
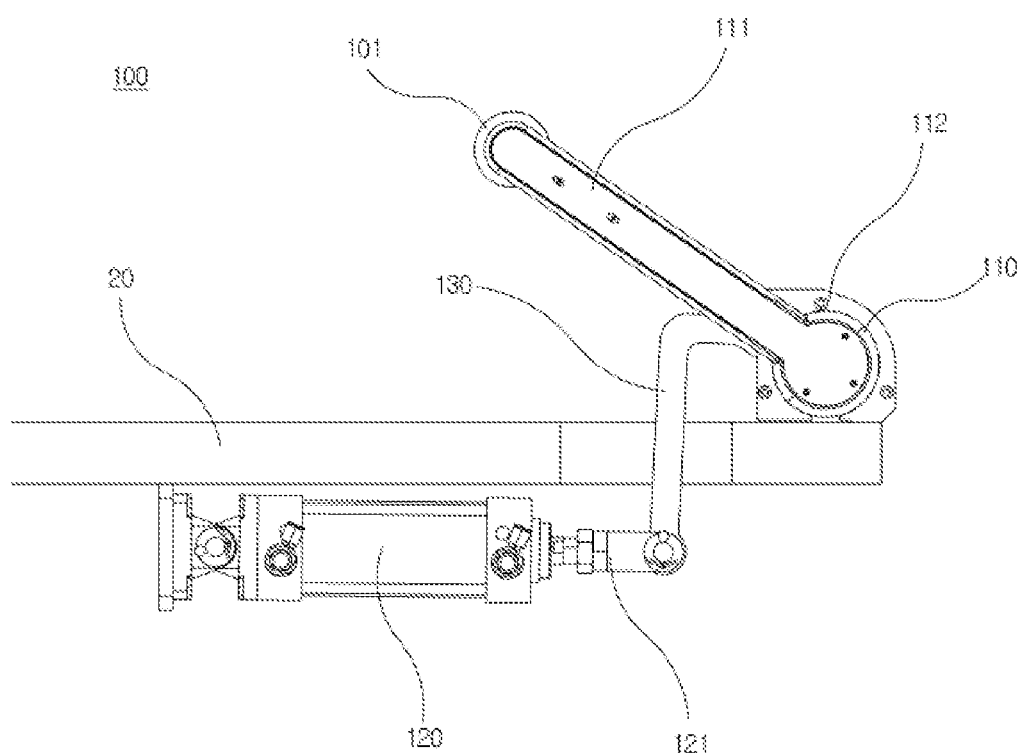
FIG. 5 is a side view illustrating the first lower roller unit of the lower roller structure of a hot air welder according to the present invention.
Figure 6:
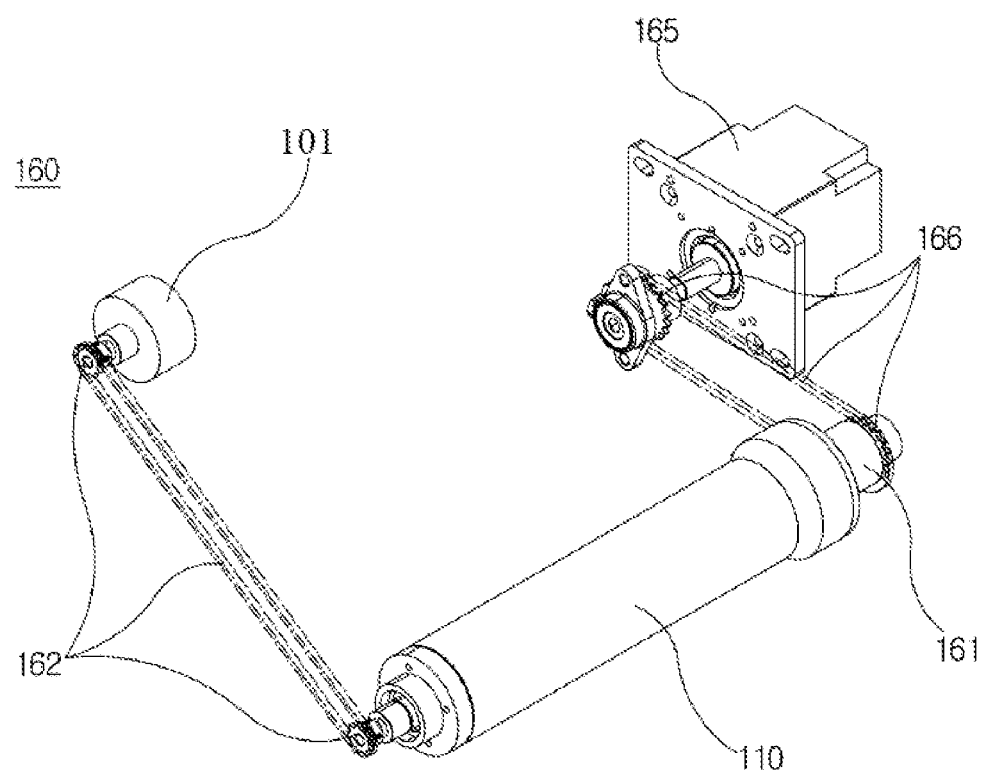
FIG. 6 is a view illustrating main parts of the first lower roller unit of the lower roller structure of a hot air welder according to the present invention.

First, referring to FIGS. 4 to 6, in the lower roller structure of a hot air welder according to the present invention, the first lower roller unit 100 is used at the time of welding flat fabrics, and includes a first lower roller 101 which is provided at one side of the main body 10 on an upper side of the worktable 20, and is pivoted vertically corresponding to the upper roller 50.

To this end, the first lower roller unit 100 includes a tubular rotation tube 110. The rotation tube 110 has one end coupled to a mounting bracket 112 disposed on the worktable 20 on one side of the main body 10 and the other end coupled with a roller support part 111, which extends toward the upper roller 50 to be pivoted in the vertical direction. At this time, it is preferable that the rear end of the rotation tube 110 extends with a predetermined length.

In addition, the rotation tube 110 includes the roller support part 111 extending from the rear end in a direction perpendicular to a longitudinal axis thereof. The first lower roller 101 is installed at a tip end of the roller support part 111.

Further, the first lower roller unit 100 includes a first drive cylinder 120. The first drive cylinder 120 is fixed to the lower surface of the worktable 20, and has a piston rod 121 for rotating the rotation tube 110.

In addition, the first lower roller unit 100 includes a pivot bar 130 for transmitting a linear movement of the piston rod 121 of the first drive cylinder 120 to the rotation tube 110 as a converted rotational force. The pivot bar 130 has one end connected to the rear end of the rotation tube 110 and the other end connected to the piston rod 121 of the first drive cylinder 120.

At this time, in the present invention, it is preferable that a portion of the worktable 20 is drilled for connecting the rotation tube 110 arranged on the upper portion of the worktable 20 with the piston rod 121 arranged on the lower portion of the worktable 20. In addition, the pivot bar 130 may be formed in a bent bar shape.

That is, the first lower roller unit 100 rotates the rotation tube 110 when the piston rod 121 advances outward, and the roller support part 111 is pivoted downward such that the first lower roller 101 is spaced apart from the upper roller 50. Conversely, the rotation tube 110 is rotated in reverse when the piston rod 121 retracts inward, and the roller support part 111 is rotated upward such that the first lower roller 101 comes into contact with the upper roller 50.

Meanwhile, in the present invention, the first lower roller unit 100 further includes a first roller driving means 160 for applying a rotational force to the first lower roller 101.

At this time, the first roller driving means 160 includes a first roller drive shaft 161. The first roller drive shaft 161 is rotatably installed in the rotation tube 110, and one end thereof is operatively connected to the first lower roller 101 by driven chain and sprockets 162 via the roller support part 111.

In addition, the first roller driving means 160 includes a first roller drive motor 165 for applying a rotational force to the first roller drive shaft 161. The first roller drive motor 165 is mounted on the main body 10, and is operatively connected to the other end of the first roller drive shaft 161 by drive chain and sprockets 166.

At this time, in the present invention, the driven chain and sprockets 162 and the drive chain and sprockets 166 are not newly implemented, but may be the common chain (not shown in the drawings) and sprockets (not shown in the drawings) for transmitting the rotational force to different rotational shafts. When applied to the present invention, the sprockets are provided at the first roller drive shaft 161 and the first lower roller 101, and the sprockets are connected by the chain. In addition, the sprockets are also provided at the first roller drive shaft 161 and the first roller drive motor 165, and the sprockets are connected by the chain.

That is, in the first roller driving means 160, when driving the first roller drive motor 165, its rotational force is transmitted to the first roller drive shaft 161, and the rotational force of the first roller drive shaft 161 is continuously transmitted to the first lower roller 101 to lead to a rotation thereof.

Figure 7:
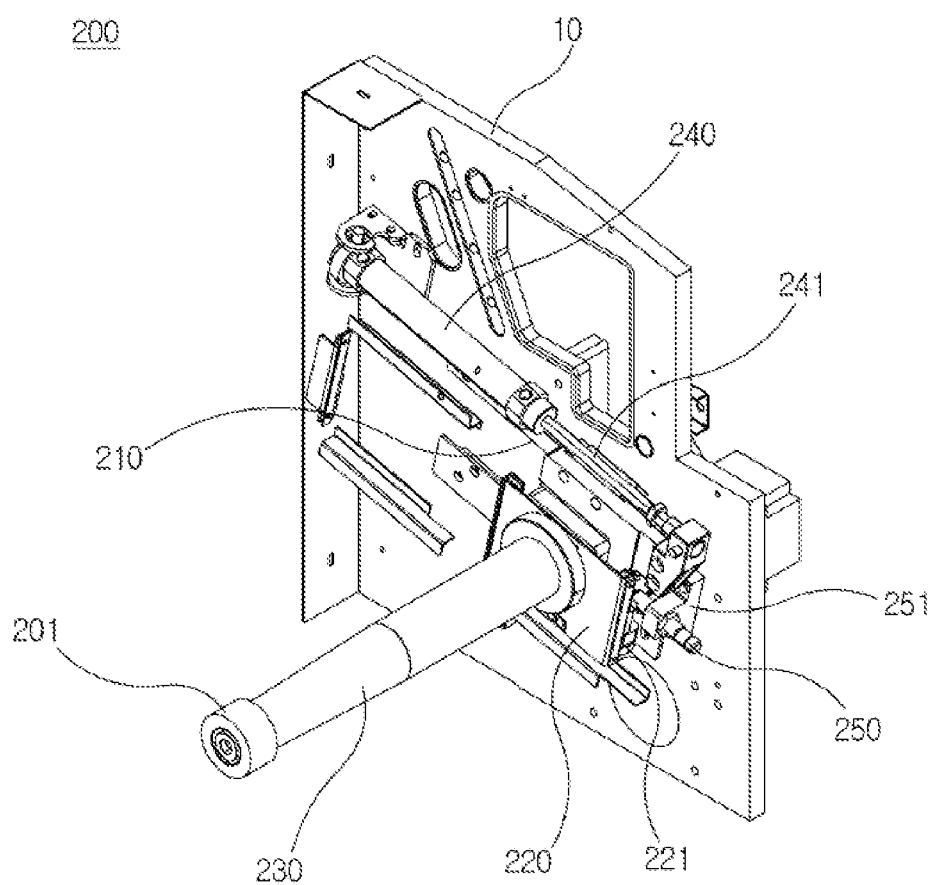
FIG. 7 is a perspective view illustrating a second lower roller unit of the lower roller structure of a hot air welder according to the present invention.
Figure 8:
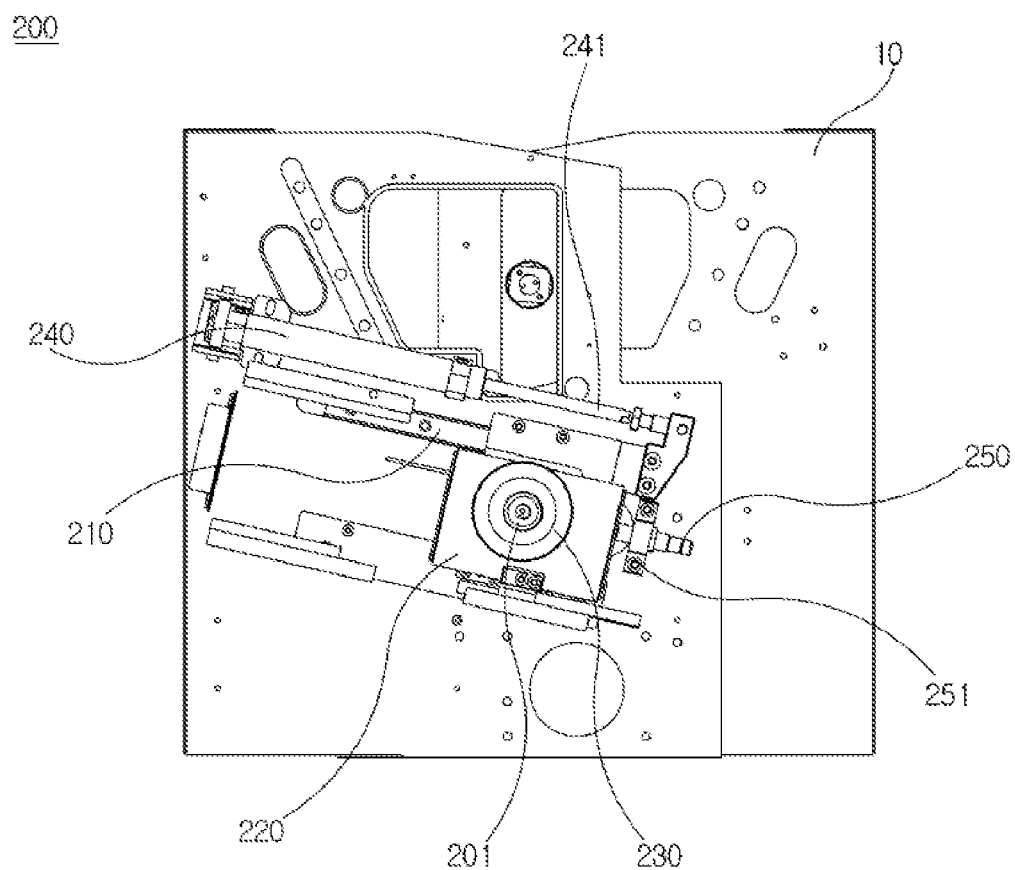
FIG. 8 is a side view illustrating the second lower roller unit of the lower roller structure of a hot air welder according to the present invention.
Figure 9:
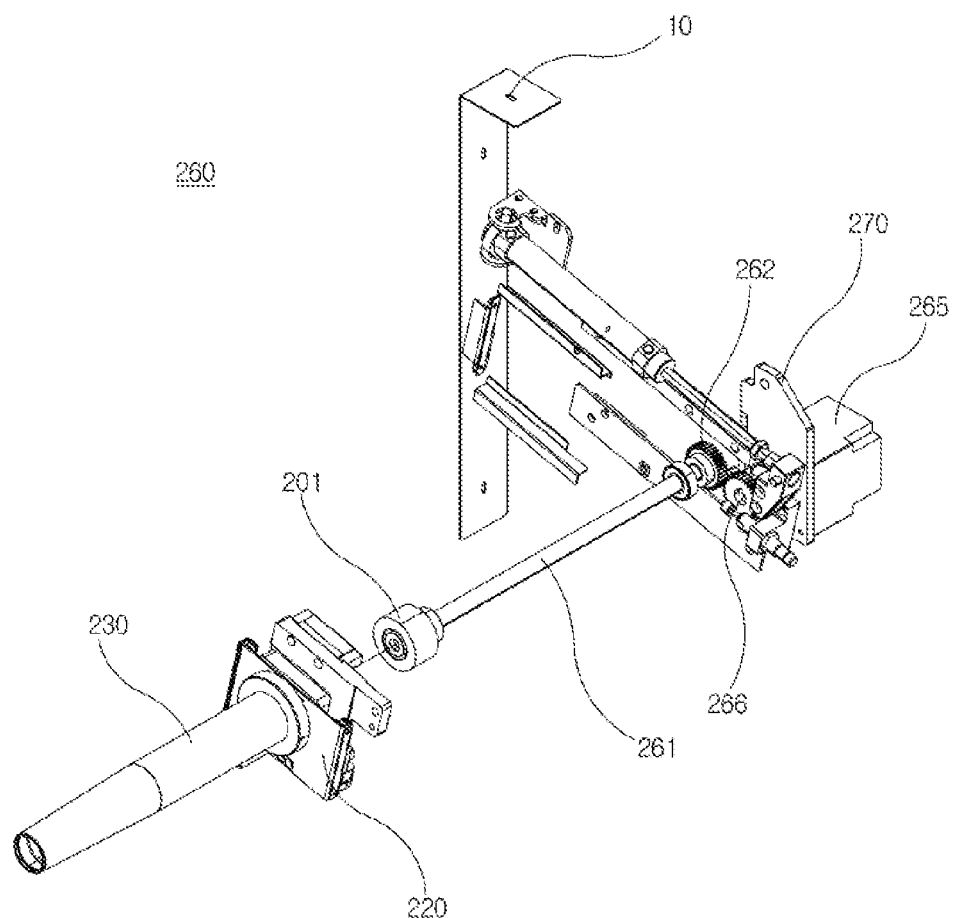
FIG. 9 is a view illustrating main parts of the second lower roller unit of the lower roller structure of a hot air welder according to the present invention.

As shown in FIGS. 7 to 9, the second lower roller unit 200 is used at the time of welding cylindrical fabrics in the lower roller structure of a hot air welder according to the present invention, and includes a second lower roller 201 which is provided at a side surface of the main body 10 on an upper side of the first lower roller unit 100 and is slidably moved in front and rear corresponding to the upper roller 50.

To this end, the second lower roller unit 200 includes a guide rail 210. The guide rail 210 is provided obliquely upward from the front to the rear on one side of the main body 10, and includes the common LM guide or the like.

In addition, the second lower roller unit 200 includes a moving plate 220 slidably coupled to the guide rail 210 and formed in the form of a half block. At this time, an upper end of the moving plate 220 is coupled to the guide rail 210 to slide in front and rear, and has a guide roller 221 installed at the lower portion thereof to roll on the side surface of the main body 10.

In addition, the second lower roller unit 200 includes a guide tube 230. The guide tube 230 has a rear end which penetrates the moving plate 220 and a front end extends toward the upper roller 50, and includes a second lower roller 201 installed at the extended front end.

Further, the second lower roller unit 200 includes a second drive cylinder 240 for moving the moving plate 220 in front and rear. The second drive cylinder 240 is installed in the main body 10, and is connected to the moving plate 220 by a piston rod 241. At this time, the second drive cylinder 240 is configured to move the moving plate 220 in front and rear by the reciprocation motion of the piston rod 241.

In addition, the second lower roller unit 200 includes a moving plate stopper 250 for limiting the forward movement of the moving plate 220. The moving plate stopper 250 is screwed to a support block 251 fixed to the front side of the main body 10 to limit the forward movement of the moving plate 220, such that positions of the second lower roller 201 and the upper roller 50 may be adjusted.

That is, the second lower roller unit 200 pulls the moving plate 220 rearward when the piston rod 241 retracts inward, such that the second lower roller 201 is spaced apart from the upper roller 50 to the rear. Conversely, when the piston rod 241 advances outward, the moving plate 220 is moved forward, such that the second lower roller 201 comes into contact with the upper roller 50.

In particular, in the present invention, the second lower roller 201 is configured to be moved obliquely upward to the rear for contact with and separation from the upper roller 50 as described above, such that there is no limitation on the second lower roller 210 for allowing the fabric to be entered when performing welding operation by the first lower roller unit 100.

Meanwhile, in the present invention, the second lower roller unit 200 further includes a second roller driving means 260 for applying a rotational force to the second lower roller 201.

At this time, the second roller driving means 260 includes a second roller drive shaft 261. The second roller drive shaft 261 is rotatably installed in the guide tube 230, and the second lower roller 201 is installed at a tip end thereof.

In addition, the second roller drive shaft 261 extends to the rear of the guide tube 230 with a predetermined length, and a driven gear 262 is installed at a rear end thereof.

In addition, the second roller driving means 260 includes a second roller drive motor 265 for applying a rotational force to the second roller drive shaft 261. The second roller drive motor 265 is installed on the inner surface of the main body 10, and has a drive gear 266 that meshes with the driven gear 262 of the second roller drive shaft 261 when the moving plate 220 moves forward to apply the rotational force to the second roller drive shaft 261.

That is, in the second roller driving means 260, when driving the second roller drive motor 265, its rotational force is transmitted to the second roller drive shaft 261 through the drive gear 266 and the driven gear 262 to rotate the second lower roller 201.

Figure 10:
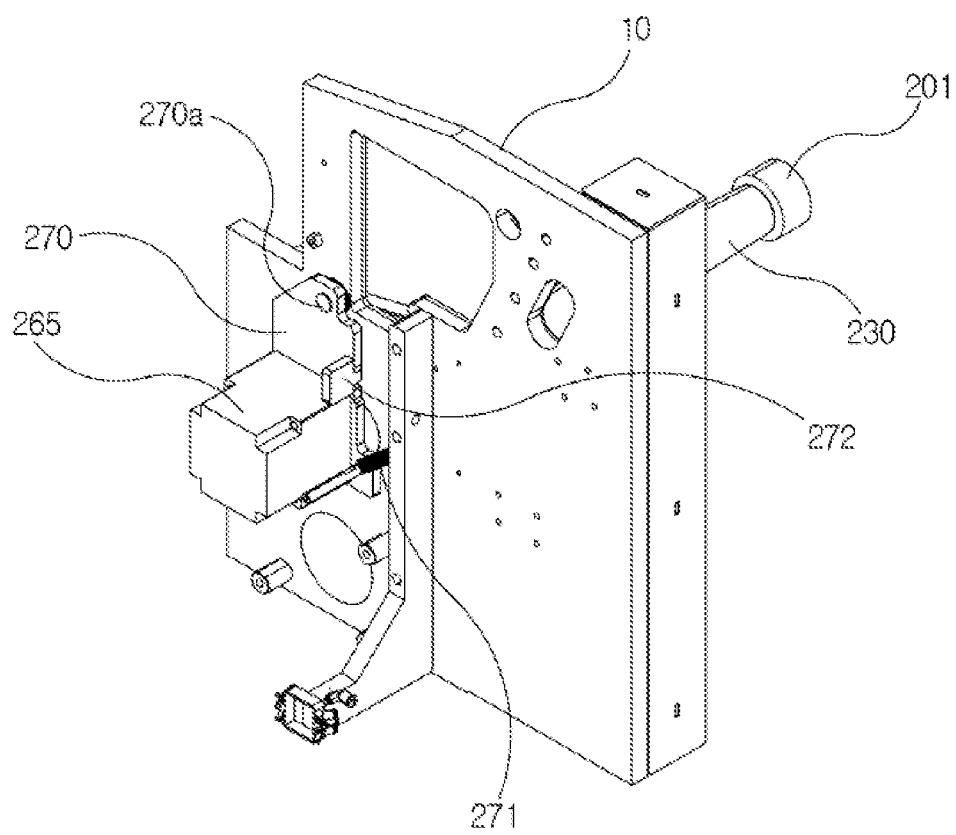
FIG. 10 is a view illustrating an embodiment of the second lower roller unit of the lower roller structure of a hot air welder according to the present invention.

Meanwhile, in the present invention, as shown in FIG. 10, the second roller drive motor 265 may be mounted on a motor movable plate 270 that has a predetermined movable force due to an elastic action when the driven gear 262 and the drive gear 266 are meshed with each other as described above.

To this end, the motor movable plate 270 is coupled to the main body 10 by an axis 270a at an upper portion thereof, of which one side is movably installed in the main body 10 by a spring 271 to have a movable force. At this time, the spring 271 serves to pull the motor movable plate 270 rearward by its own elasticity.

In addition, the motor movable plate 270 is configured to have a locking force in a direction in which the spring 271 is pulled by the movable plate stopper 272.

That is, the motor movable plate 270 absorbs shock by providing a predetermined elasticity during the moving plate 220 is moved and the driven gear 262 is meshed with the drive gear 266, and allows the gears to be meshed with each other through the predetermined movable force.

Hereinafter, an operation of the lower roller structure of a hot air welder according to the present invention having the above-mentioned configuration will be described in detail with reference to the accompanying drawings.

As shown in FIGS. 1 to 10, the lower roller structure of a hot air welder according to the present invention uses a single hot air welder through alternate use of the first lower roller unit 100 and the second lower roller unit 200, such that it is possible to easily perform welding operation of flat fabrics or cylindrical fabrics such as sleeves of clothing.

In this regard, an operating process of the lower roller structure will be described.

First, it is possible to weld the waterproof tape to normal flat fabrics by using the first lower roller unit 100.

To this end, in the present invention, by arranging the first lower roller 101 of the first lower roller unit 100 under the upper roller 50, the second lower roller 201 of the second lower roller unit 200 may be separated so as to avoid collision with the upper roller 50.

Figure 11:
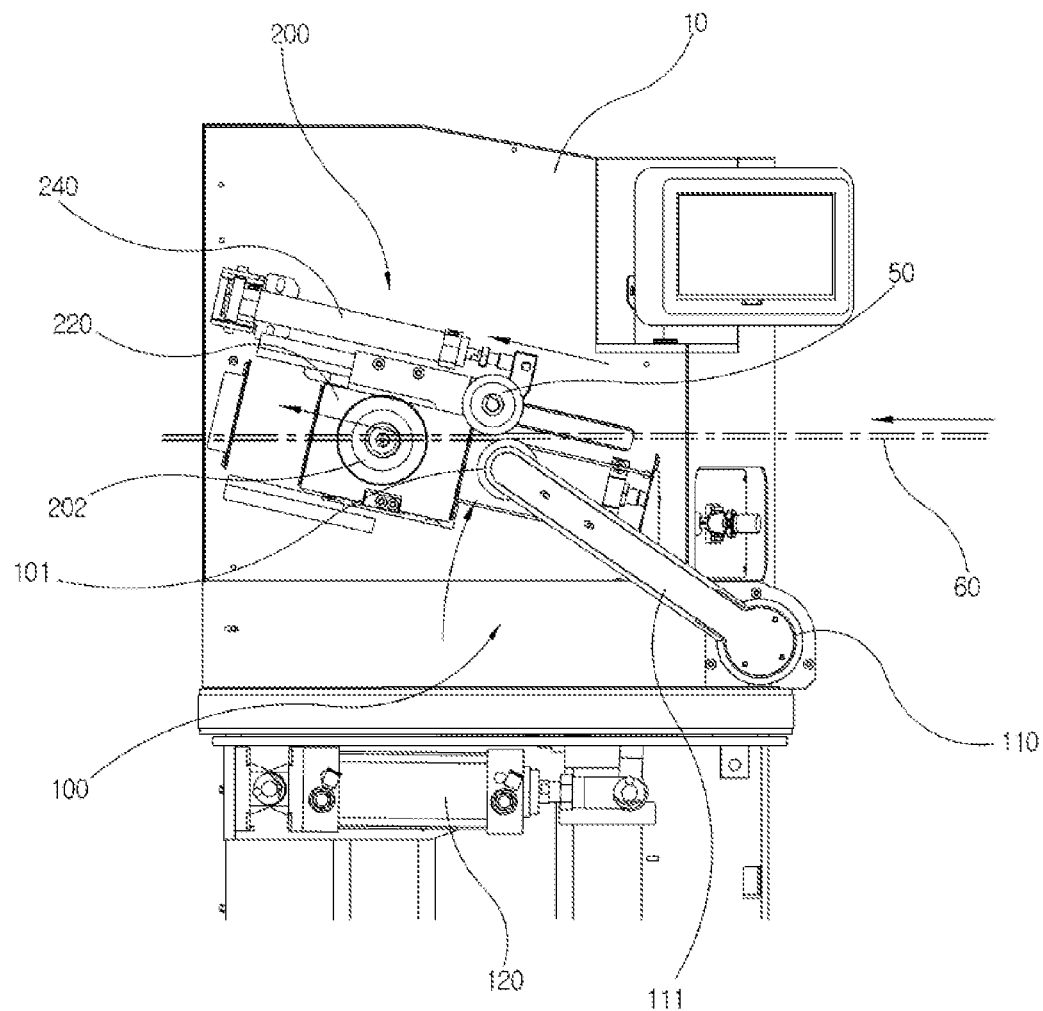
FIG. 11 is a view illustrating an operation state of the first lower roller unit of the lower roller structure of a hot air welder according to the present invention.

Referring to FIGS. 4 to 6, as shown in FIG. 11, first, when the second lower roller 201 is separated from the upper roller 50, and the piston rod 241 of the second drive cylinder 240 retracts inward, the moving plate 220 connected to the piston rod 241 is moved rearward along the guide rail 210. Accordingly, the guide tube 230 equipped with the second lower roller 201 is moved together to be separated from the upper roller 50.

Thereafter, the first lower roller unit 100 may be mounted by the operation of the first drive cylinder 120. When the piston rod 121 retracts inward by the operation of the first drive cylinder 120, the rotation tube 110 rotates and the roller support part 111 is pivoted upward. Accordingly, the first lower roller 101 lifts and comes into contact with the upper roller 50 to prepare for the welding operation.

Further, in the present invention, it is possible to drive the first lower roller 101 by the first roller driving means 160 in preparation for the welding operation as described above. That is, a power, that is, a rotational force of the first roller drive motor 165 is transmitted to the first roller drive shaft 161 through the drive chain and sprockets 166 to rotate the same, and the rotational force is continuously transmitted to the first lower roller 101 through the driven chain and sprockets 162 so as to rotate the first lower roller 101.

Therefore, the welding operation may be performed by the pressing of the upper roller 50 and the first lower roller 101. At this time, since there are no obstacles on the left and right of the upper roller 50 and the first lower roller 101, a flat fabric 60 may be freely entered therebetween from the front to perform welding operation.

In addition, it is possible to weld the waterproof tape to the cylindrical fabric such as sleeves of clothing by using the second lower roller unit 200.

To this end, in the present invention, by arranging the second lower roller 201 of the second lower roller unit 200 under the upper roller 50, the first lower roller 101 of the first lower roller unit 100 may be separated so as to avoid collision with the upper roller 50.

Figure 12:
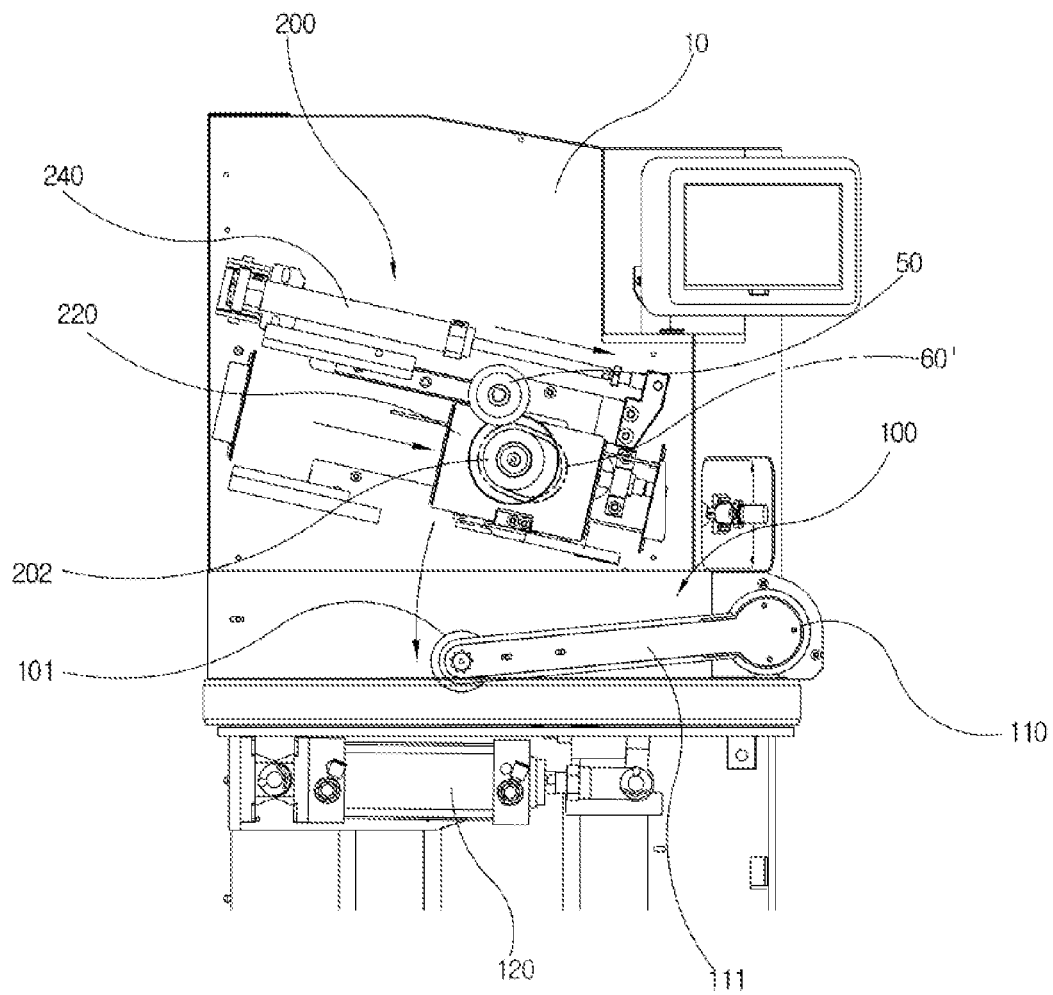
FIG. 12 is a view illustrating an operation state of the second lower roller unit of the lower roller structure of a hot air welder according to the present invention.

Referring to FIGS. 7 to 9, as shown in FIG. 12, first, when the first lower roller 101 is separated from the upper roller 50 and the piston rod of the first drive cylinder 120 advances outward, the rotation tube 110 rotates opposite to that when mounted, and the roller support part 111 is pivoted downward. Accordingly, the first lower roller 101 lowers and is separated from the upper roller 50 without collision.

Thereafter, when the second lower roller unit 200 is mounted and the piston rod 241 advances outward by the operation of the second drive cylinder 240, the moving plate 220 connected with the piston rod 241 is moved forward along the guide rail 210. Accordingly, the guide tube 230 equipped with the second lower roller 201 is moved together, such that the second lower roller 201 comes into contact with the lower portion of the upper roller 50 to prepare for the welding operation.

Further, in the present invention, when the moving plate 220 is moved forward as described above to prepare the welding operation, the second roller driving means 260 is mounted. That is, when the moving plate 220 is moved forward, the driven gear 262 provided in the guide tube 230 is meshed with the drive gear 266 of the second roller drive motor 265, then the power of the second roller drive motor 265 is transferred to the second roller drive shaft inside the guide tube 230 so as to rotate the second lower roller 201.

Next, the welding operation may be performed by the pressing of the upper roller 50 and the second lower roller 201. At this time, since there are no obstacles in the front, rear, and upper and lower portions of the upper roller 50 and the second lower roller 201, a cylindrical fabric 60' may be freely entered therebetween from the side to perform welding operation.

As described above, the lower roller structure of a hot air welder according to the present invention enables various welding operations depending on the shape of the fabric using a single hot air welder, thereby costs required for preparing the device may be reduced and the hot air welder may be efficiently used.

DESCRIPTION OF REFERENCE NUMERALS

| | |
|---|---|
| 100: First lower roller unit | 101: First lower roller |
| 110: Rotation tube | 111: Roller support part |
| 112: Mounting bracket | 120: First drive cylinder |
| 121: Piston rod | 130: Pivot bar |
| 160: First roller driving means | 161: First roller drive shaft |
| 162: Driven chain and sprockets | 165: First roller drive motor |
| 166: Drive chain and sprockets | |
| 200: Second lower roller unit | 201: Second lower roller |
| 210: Guide rail | 220: Moving plate |
| 221: Guide roller | 230: Guide tube |
| 240: Second drive cylinder | 241: Piston rod |
| 250: Moving plate stopper | 251: Support block |
| 260: Second roller driving means | 261: Second roller drive shaft |
| 262: Driven gear | 265: Second roller drive motor |
| 266: Drive gear | 270: Motor movable plate |
| 271: Spring | 272: Movable plate stopper |

The invention claimed is:

1. A lower roller structure of a hot air welder which comprises
a main body having a worktable plate installed on one side of a middle portion thereof,
a support arm unit which has a vertically movable upper roller at an upper portion of the main body, and extends to an upper side of the worktable plate,
wherein the lower roller structure is configured to press a fabric with the upper roller to perform hot welding, the lower roller structure comprising:
a first lower roller unit including a first lower roller which is provided at one side of the main body on the upper side of the worktable plate, and is pivoted vertically corresponding to the upper roller; and
a second lower roller unit including a second lower roller which is provided at a side surface of the main body on an upper side of the first lower roller unit and is slidably movable in front and rear corresponding to the upper roller;
wherein the first lower roller unit and the second lower roller unit are replaceable with each other so that one of the first lower roller and the second lower roller performs a welding operation on a flat fabric or a cylindrical fabric in association with the upper roller,
wherein the second lower roller unit comprises:
a guide rail provided obliquely upward from the front to the rear on one side of the main body;
a moving plate slidably coupled to the guide rail and having a guide roller;
a guide tube whose rear end penetrates the moving plate, which extends toward the upper roller, and has the second lower roller installed at one end thereof;
a second drive cylinder installed on the main body and connected to the moving plate by a piston rod to slide the moving plate in front and rear; and
a moving plate stopper screwed to a support block on a front side of the main body to limit a forward moving force of the moving plate,
wherein the second lower roller is positioned under or spaced apart from the upper roller by the sliding of the moving plate.

2. The lower roller structure according to claim 1, wherein the first lower roller unit comprises:
a rotation tube whose one end is coupled to a mounting bracket disposed on the worktable plate on the one side of the main body and another end is coupled with a roller support part which is pivoted vertically and extends toward the upper roller in a direction perpendicular to a longitudinal axis thereof, wherein the first lower roller is installed at a tip end of the roller support part;
a first drive cylinder installed on the worktable plate and having a piston rod for rotating the rotation tube; and
a pivot bar whose one end is connected to the rotation tube and another end is connected to the piston rod to convert a linear movement of the piston rod of the first drive cylinder into a rotational force of the rotation tube,
wherein the first lower roller is positioned under or spaced apart from the upper roller by the rotation of the rotation tube.

3. The lower roller structure according to claim 2, wherein the first lower roller unit further comprises a first roller driving means for applying a rotational force to the first lower roller,
wherein the first roller driving means comprises:
a first roller drive shaft installed in the rotation tube, of which one end is connected to the first lower roller by driven chain and sprockets; and
a first roller drive motor mounted on the main body and connected to another end of the first roller drive shaft by drive chain and sprockets to apply the rotational force to the first roller drive shaft.

4. The lower roller structure according to claim 1, wherein the second lower roller unit further comprises a second roller driving means for applying a rotational force to the second lower roller,
wherein the second roller driving means comprises:
a second roller drive shaft installed in the guide tube, wherein the second lower roller is installed at a front end thereof, and a driven gear is installed at a rear end thereof; and
a second roller drive motor mounted on the main body and having a drive gear that meshes with the driven gear when the moving plate moves forward to apply the rotational force to the second roller drive shaft.

5. The lower roller structure according to claim 4, further comprising a motor movable plate coupled to the main body by an axis, of which one side is movably installed in the main body by a spring to have a movable force, and having a movable plate stopper which provides a latching force in a direction in which the spring is pulled by the movable plate stopper,
wherein, in the process in which the second roller drive motor is mounted on the motor movable plate and the driven gear is meshed with the drive gear, shock is absorbed by elasticity of the spring.

* * * * *